United States Patent [19]

Schwarz et al.

[11] Patent Number: 4,869,471
[45] Date of Patent: Sep. 26, 1989

[54] LENGTH OF HOSE MADE OUT OF AN ELASTIC MATERIAL THAT READILY RECOVERS ITS SHAPE

[75] Inventors: Günter Schwarz, Altenkirchen; Ulrich Neuhaus, Iserlohn, both of Fed. Rep. of Germany

[73] Assignees: Altenkirchener Kunststoff GmbH, Mammelzen; Hoesch Aktiengesellschaft, Dortmund, both of Fed. Rep. of Germany

[21] Appl. No.: 252,158

[22] Filed: Sep. 30, 1988

[30] Foreign Application Priority Data

Nov. 2, 1987 [DE] Fed. Rep. of Germany ....... 3737104

[51] Int. Cl.$^4$ .............................................. F16F 3/10
[52] U.S. Cl. ...................................... 267/33; 267/166; 267/180; 267/286
[58] Field of Search .................. 267/286, 33, 81, 166, 267/168, 166.1, 179, 180, 287, 288, 148–149, 83, 84, 90, 91

[56] References Cited

U.S. PATENT DOCUMENTS

| 85,938 | 1/1869 | Kirkpatrick | 267/180 |
|---|---|---|---|
| 170,973 | 12/1875 | Tyler | 267/180 X |
| 1,529,441 | 3/1925 | Leinert | 267/286 X |
| 1,586,353 | 5/1926 | Colegrove | 267/33 |
| 1,679,698 | 8/1928 | Weydert | 267/33 |
| 1,751,261 | 3/1930 | Wilson | 267/166.1 |
| 2,230,069 | 1/1941 | Rushmore | 267/33 |
| 2,247,543 | 7/1941 | Bernstein | 267/84 X |
| 2,276,516 | 3/1942 | Roy | 267/81 |
| 2,832,587 | 4/1958 | Robert | 267/33 |
| 2,893,789 | 7/1959 | Heinz | 267/180 X |
| 3,073,565 | 1/1963 | Daumy | 267/180 X |
| 3,161,407 | 12/1964 | Robin | 267/33 X |
| 3,711,917 | 1/1973 | Baumgras | 267/166 X |
| 3,727,902 | 4/1973 | Burckhardt et al. | 267/166.1 |
| 3,761,069 | 9/1973 | Moore | 267/152 |
| 3,884,447 | 5/1975 | Alexander et al. | 267/166 X |
| 4,077,619 | 3/1978 | Borlinghaus | 267/166.1 |
| 4,111,407 | 9/1978 | Stager | 267/166.1 |
| 4,120,489 | 10/1978 | Borlinghaus | 267/166.1 |
| 4,377,280 | 3/1983 | Wienand et al. | 267/180 |
| 4,640,500 | 2/1987 | Shiau | 267/168 |
| 4,753,423 | 6/1988 | Ukai et al. | 267/286 |
| 4,763,882 | 8/1988 | Nishiyama et al. | 267/33 |

FOREIGN PATENT DOCUMENTS

| 2509934 | 9/1976 | Fed. Rep. of Germany | 267/84 |
|---|---|---|---|
| 2620149 | 11/1977 | Fed. Rep. of Germany | 267/166 |
| 3031582 | 3/1982 | Fed. Rep. of Germany | 267/149 |
| 0008709 | 1/1981 | Japan | 267/286 |
| 0020843 | 2/1981 | Japan | 267/166 |
| 0258236 | 11/1987 | Japan | 267/180 |
| 1315689 | 6/1987 | U.S.S.R. | 267/166 |
| 270169 | 5/1927 | United Kingdom | 267/286 |
| 301075 | 10/1929 | United Kingdom | 267/286 |
| 1235445 | 6/1971 | United Kingdom | 267/180 |

Primary Examiner—Douglas C. Butler
Attorney, Agent, or Firm—Max Fogiel

[57] ABSTRACT

A length of hose made out of an elastic material that readily recovers its shape, especially intended for covering the coiled section of a helical compression spring with a progressive characteristic of the type employed in motor vehicles and similar machines. At least one terminating section of the length of hose has a shorter inside diameter and communicates with the remaining, cylindrical, section of the length of hose through an intermediate section that tapers conically at least inside.

7 Claims, 2 Drawing Sheets

LENGTH OF HOSE MADE OUT OF AN ELASTIC MATERIAL THAT READILY RECOVERS ITS SHAPE

BACKGROUND OF THE INVENTION

The invention concerns, first, a length of hose made out of an elastic material that readily recovers its shape, especially intended for covering the coiled section of a helical compression spring with a progressive characteristic of the type employed in motor vehicles and similar machines, and, second, a method of manufacturing it.

Helical compression springs are employed in the suspensions of motor vehicles. If the spring has a progressive characteristic, at least one section of the rod that it is made out of tapers conically near the end through at least one winding, with the very end of the rod becoming cylindrical again, although with a shorter cross-section. The tapered section near the end of a helical compression spring of this type is enclosed in an extruded hose of constant cross-section to reduce noise and to protect the spring against corrosion. A length of hose of this type is made out of an elastic and readily recovering plastic, thermoplastic polyurethane for example, and has a large enough cross-section or inside diameter to allow it to be drawn loosely over the tapered section, with its initial section resting tight against the larger or regular cross-section of the spring rod due to the elasticity of the plastic and secured at that point. The other end of the hose-like cover is closed. Before a length of hose of this type can be drawn over the spring, a liquid anticorrosion agent and lubricant is injected into the hose to facilitate drawing it over the spring and to extensively prevent corrosion of the tapered section of the spring surrounded by the hose. Aside from the necessity of the additional operation of closing off one end of the hose, the welded-together end of a length of hose of this type, which is relatively loose in the vicinity of the reduced spring-rod cross-section is likely to become damaged as the result of outside events and allow the liquid it contains to leak out and admit moisture, dirt, etc. It is in particular the desirable protection against corrosion that is accordingly lost.

SUMMARY OF THE INVENTION

One object of the invention is to improve a length of hose made out of an elastic material that readily recovers its shape, especially intended for covering the coiled section of a helical compression spring with a progressive characteristic of the type employed in motor vehicles and similar machines, to the extent that both ends of the length of hose will rest tightly against the spring rod, preventing moisture and dirt from entering and anticorrosion agent and lubricant from leaking out, while noise is also reduced.

This object is attained in accordance with the invention by the improvement wherein at least one terminating section of the length of hose has a shorter inside diameter and communicates with the remaining, cylindrical, section of the length of hose through an intermediate section that tapers conically at least inside.

A length of hose of this type can easily be drawn over a helical compression spring with a progressive characteristic and a conically tapering section at the end. The terminating section of the length of hose that has a shorter inside diameter will also rest tight against the spring. The previously necessary welding operation can be eliminated. Since the end of the spring projects out of the length of hose to a prescribed extent, the hose will be difficult to damage, and the anticorrosion agent and lubricant will not leak out, maintaining the life of the hose.

Another object of the invention is to improve a method of manufacturing a length of hose of the aforesaid type wherein hose that emerges continuously from an extruder is, while simultaneously being cooled, intercepted by a drawing mechanism operating at a speed that is related in some way to the rate of extrusion and continuously removed.

This object is attained in accordance with the invention by the improvement wherein the rate of extrusion can be maintained constant while the speed of the drawing mechanism is increased, briefly maintained, and then decreased to its original level. A length of hose of the same shape can, however, also be obtained in that the speed of the drawing mechanism is maintained constant while the rate of extrusion is decreased, briefly maintained, and then increased to its original level. It is also possible to briefly decrease the rate of extrusion while the speed of the drawing mechanism is briefly increased. The section of hose that is a hollow cylinder with a smaller cross-section and the section of hose with the regular cross-section can then be completely or partly cut through, leaving lengths of hose with at least one terminating section that has a shorter inside diameter.

Further characteristics of the method in accordance with the invention are recited in claims 9 through 16.

Various embodiments of the invention will now be specified with reference to the drawing.

DESCRIPTION OF THE PREFERRED EMBODIMENTS

Figure 1:
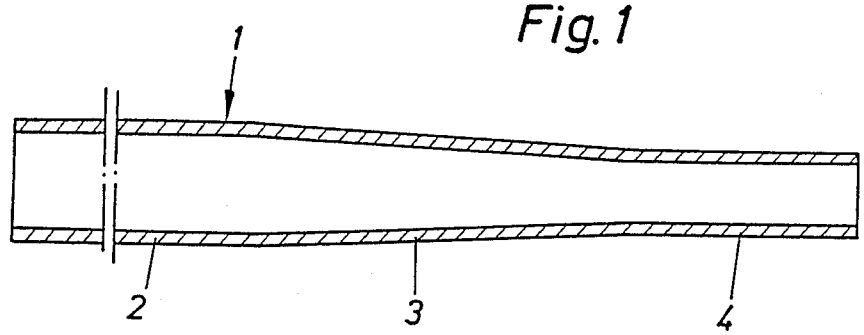
FIG. 1 is a section through a length of hose in accordance with the invention.

FIG. 1 illustrates a length 1 of hose with a wall approximately 1 mm thick made out of a thermoplastic polyurethane. The length of hose has a section 2 in the form of a hollow cylinder with an inside diameter of approximately 12.1 mm. Adjoining section 2 is an intermediate section 3 that tapers conically along length 1 of hose and merges into a terminating section 4 with a smaller cross-section or shorter inside diameter of 9.6 mm for example. Length 1 of hose can be drawn over a helical compression spring with a progressive characteristic and a diameter of approximately 13.5 mm that decreases at the end to approximately 11.0 mm. The cylindrical section 2 and the terminating section 4 of length 1 of hose rest tight against the rod that the spring is made out of, especially because of the elasticity of the hose, and ensure that any anticorrosion agent and lubricant inside the hose will not leak out and that any moisture and dirt outside the hose will not enter it.

Figure 2:
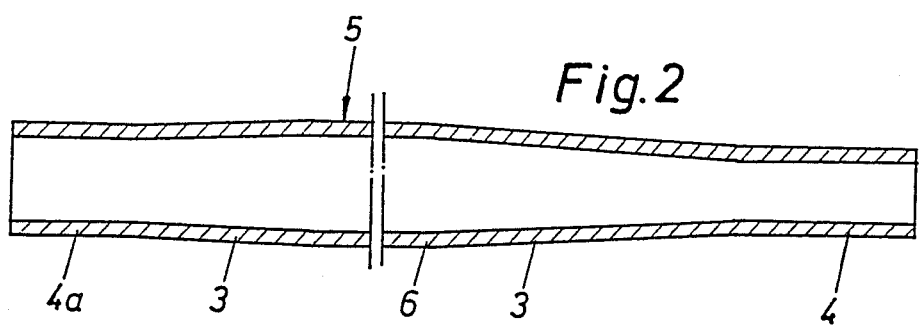
FIG. 2 is a section through another embodiment of a length of hose in accordance with the invention.

The length 5 of hose illustrated in FIG. 2 differs from the length 1 of hose illustrated in FIG. 1 in that it has two intermediate sections 3, each adjoining one end of a regular section 5, that merge into terminating sections 4 and 4a, which have a shorter inside diameter. The terminating section 4a of length 5 of hose rests tight against the regular cross-section of the spring rod and terminating section 4 rests against its smaller cross-section.

Figure 3:
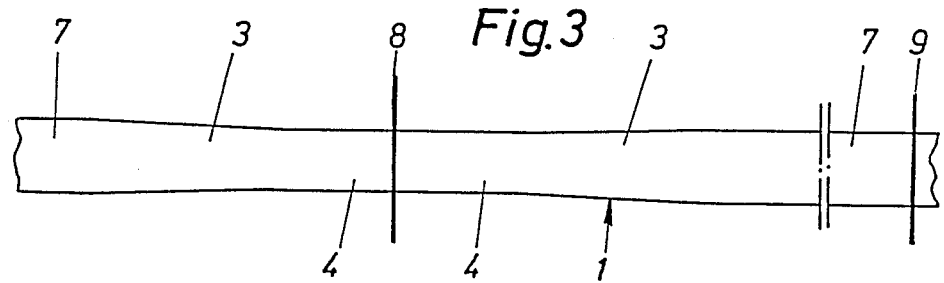
FIG. 3 is a view of a hose from which lengths like that illustrated in FIG. 1 can be cut.
Figure 4:
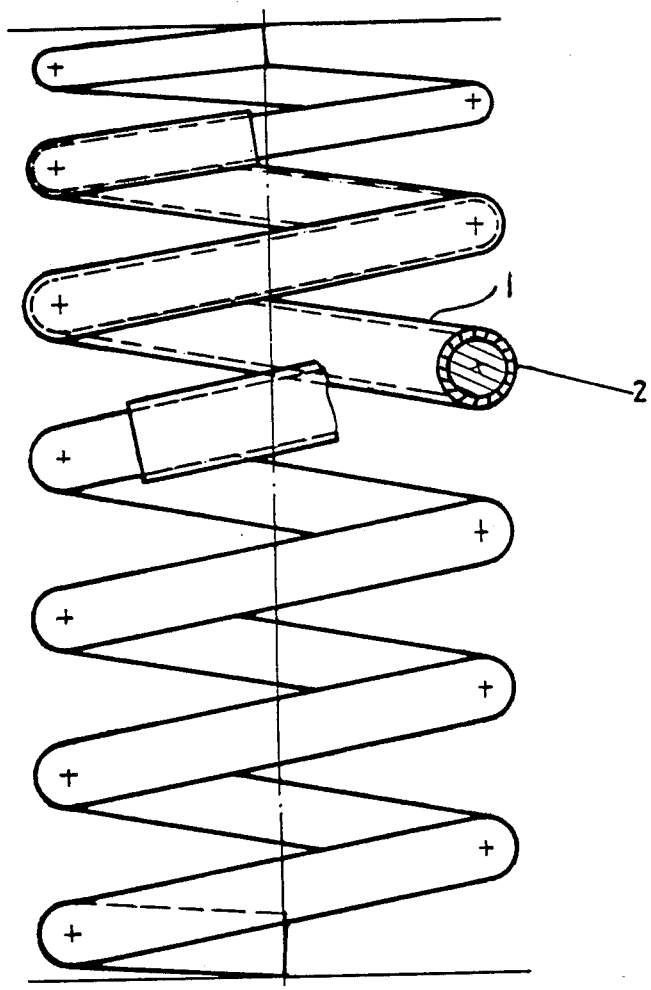
FIG. 4 is a coil spring with the hose of the invention.

The length 1 of hose illustrated in FIG. 1 is manufactured out of the extruded hose 7 illustrated in FIG. 3. Hose 7 emerges continuously in a plastic state from an extruder, is cooled to a prescribed temperature over a very short path, in a water bath for example, and is immediately intercepted by a drawing mechanism, a double or triple creeper belt for example, and continuously removed. These mechanisms are not illustrated. The drawing mechanism is usually also accommodated in a water bath, in which hose 7 can be cooled down to its final temperature.

The speed of the drawing mechanism is precisely adjusted to the rate at which hose 7 emerges from the extruder. The speed of the drawing mechanism is increased, not suddenly but along a prescribed length of hose 7, producing an intermediate section 3 at the end of the hose that taper conically longitudinally. As soon as the speed of the drawing mechanism attains its prescribed level, it is maintained constant over a prescribed distance or prescribed length of hose 7, producing a terminating section 4 with a smaller cross-section or shorter inside diameter. Once terminating section 4 is as long as necessary, the rate of the drawing mechanism is decreased to its original level, again not suddenly but over a prescribed length of the hose, producing a conically expanding intermediate section 3 that is followed by a section of the original cross-section. Once hose 7 has been cooled down to its final temperature, it is cut in two in the middle of the terminating section 4 with the smaller cross-section, along line 8 for example, and in the middle of the section with the regular cross-section, along line 9 for example, resulting in the length 1 of hose illustrated in FIG. 1.

In another embodiment of the method in accordance with the invention, the speed of the drawing mechanism is maintained constant and the rate of extrusion briefly decreased. It is also possible to vary the speed of the drawing mechanism and the rate of extrusion simultaneously.

The present specification and claims are of course intended solely as illustrative of one or more potential embodiments of the invention and should not be construed as limiting it in any way. The invention may accordingly be adapted and modified in many ways that nmay occur to one of skill in the art without deviating from the theory behind it or exceeding the scope of its application.

We claim:

1. A length of hose of elastic material that recovers its shape readily for covering a coiled section of a cylindrical helical compression spring with a progressive characteristic corresponding to a type in motor vehicles and similar machines; said length of hose comprising at least one terminating section having a shorter inside diameter than the diameter of a main section of the hose, said main hose section having a cylindrical shape; and an intermediate section between said terminal section and said main section, said terminal section communicating with said main section through said intermediate section; said intermediate section tapering conically at least on the inside of said intermediate section, said length of hose covering only a predetermined coiled section of said helical compression spring to prevent noise effects said hose preventing metal-to-metal contact between individual coils; at least one end of said helical compression spring having a conically-shaped section and having a diameter that is smaller than that of the remaining part of the spring so that said conically-shaped section reduces in diameter in direction toward the spring end; said hose fitting against said conically-shaped section and leaving free the spring ends to prevent damage to said hose; said hose being drawn over non-uniform parts of said spring and enclosing the surface of said parts to prevent moisture penetration causing corrosion and to prevent leaking out of anticorrosion agent and lubricant.

2. A length of hose as defined in claim 1, wherein said main section has two terminating sections, each terminating section having a shorter inside diameter than the diameter of said main section of the hose.

3. A length of hose as defined in claim 2, wherein said two terminating sections have different inside diameters.

4. A length of hose as defined in claim 1, wherein said length of hose has a constant outside diameter.

5. A length of hose as defined in claim 1, wherein said length of hose has a wall with constant thickness over the total length of said hose.

6. A length of hose as defined in claim 1, wherein said hose is cut through in the middle of the terminating section with the shorter inside diameter and in the middle of the main section in two lengths of hose of predetermined extension.

7. A length of hose of elastic material that recovers its shape readily for covering a coiled section of a cylindrical helical compression spring with a progressive characteristic corresponding to a type in motor vehicles and similar machines; said length of hose comprising at least one terminating section having a shorter inside diameter than the diameter of a main section of the hose, said main hose section having a cylindrical shape; and an intermediate section between said terminal section and said main section, said terminal section communicating with said main section through said intermediate section; said intermediate section tapering conically at least on the inside of said intermediate section, said length of hose covering only a predetermined coiled section of said helical compression spring to prevent noise effects; said hose preventing metal-to-metal contact between individual coils; at least one end of said helical compression spring having a conically-shaped section and having a diameter that is smaller than that of the remaining part of the spring so that said conically-shaped section reduces in diameter in direction toward the spring end; said hose fitting against said conically-shaped section and leaving free the spring ends to prevent damage to said hose; said hose being drawn over non-uniform parts of said spring and enclosing the surface of said parts to prevent moisture penetration causing corrosion and to prevent leaking out of anticorrosion agent and lubricant; said main section having two terminating sections, each terminating section having a shorter inside diameter than the diameter of said main section of the hose; said two terminating sections having different inside diameters; said length of hose having a constant outside diameter; said hose being cut through in the middle of the terminating section with the shorter inside diameter and in the middle of the main section in two lengths of hose of predetermined extensions.

* * * * *